United States Patent
Spencer

(10) Patent No.: US 9,203,934 B2
(45) Date of Patent: Dec. 1, 2015

(54) SYNCHRONIZATION OF CLOCKS BETWEEN TWO COMMUNICATION TERMINALS USING TCP/IP

(75) Inventor: Percy L. Spencer, Falmouth, ME (US)

(73) Assignee: salesforce.com, inc., San Francisco, CA (US)

( * ) Notice: Subject to any disclaimer, the term of this patent is extended or adjusted under 35 U.S.C. 154(b) by 414 days.

(21) Appl. No.: 13/563,450

(22) Filed: Jul. 31, 2012

(65) Prior Publication Data

US 2013/0036239 A1 Feb. 7, 2013

Related U.S. Application Data

(60) Provisional application No. 61/513,769, filed on Aug. 1, 2011.

(51) Int. Cl.
*G06F 15/173* (2006.01)
*H04L 29/06* (2006.01)
*H04J 3/06* (2006.01)

(52) U.S. Cl.
CPC .............. *H04L 69/16* (2013.01); *H04J 3/0667* (2013.01); *H04L 69/28* (2013.01)

(58) Field of Classification Search
USPC ........................................................ 709/228
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |

(Continued)

*Primary Examiner* — Alicia Baturay
(74) *Attorney, Agent, or Firm* — Blakley Sokoloff Taylor & Zafman LLP

(57) ABSTRACT

Clocks of communication terminals can be synchronized using packets over TCP/IP. In one example, an Internet Protocol packet is received at the first terminal from the second terminal, the packet having a time stamp indicating the time at which it was sent from the second terminal. The time is determined at which the packet arrived at the first terminal and compared to the time stamp to determine a minimal feasible bias. The determined minimal feasible bias is compared to a stored bias and the stored bias is set to the determined minimal feasible bias if the stored bias is less than the minimal feasible bias. A clock time difference is then determined at the second terminal using the stored bias.

19 Claims, 4 Drawing Sheets

(56) References Cited

U.S. PATENT DOCUMENTS

| | | |
|---|---|---|
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,616 B2 * | 11/2004 | Larson et al. ............... 709/228 |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 8,139,489 B2 * | 3/2012 | Froehlich et al. ............. 370/235 |
| 8,606,949 B2 * | 12/2013 | Wogsberg ............ H01N 7/181 345/1.1 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0052431 A1 * | 2/2009 | Kroener ............ H04J 3/0664 370/350 |
| 2011/0072366 A1 | 3/2011 | Spencer et al. |

\* cited by examiner

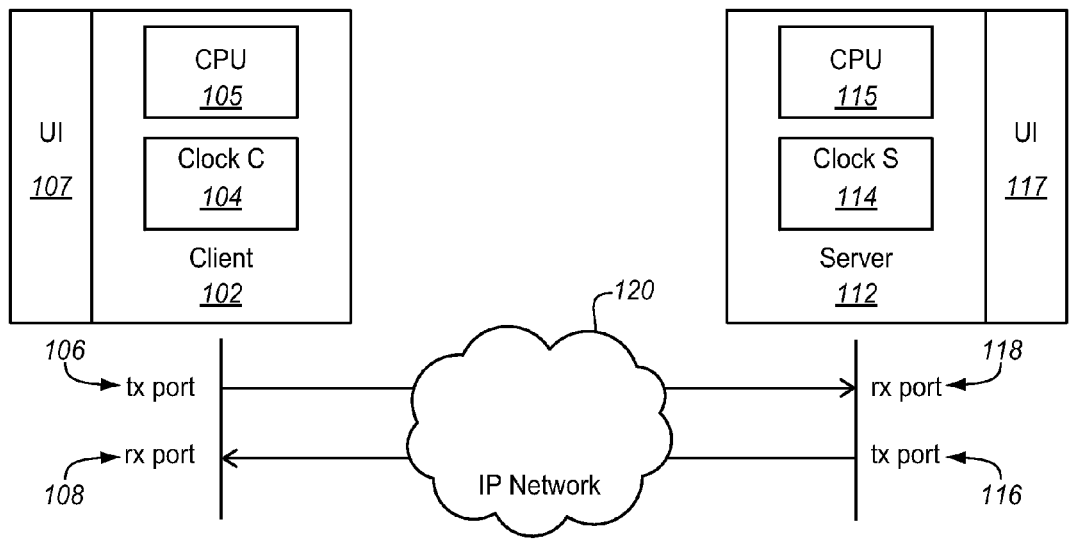
FIG. 1
FIG. 2A
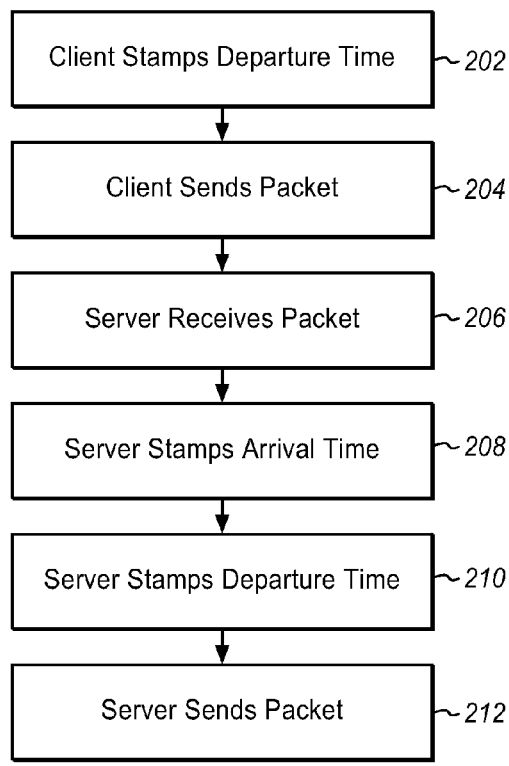

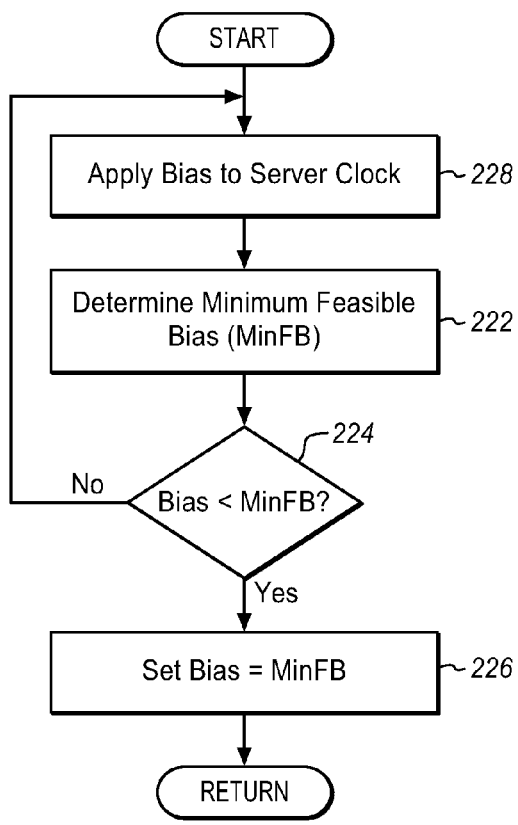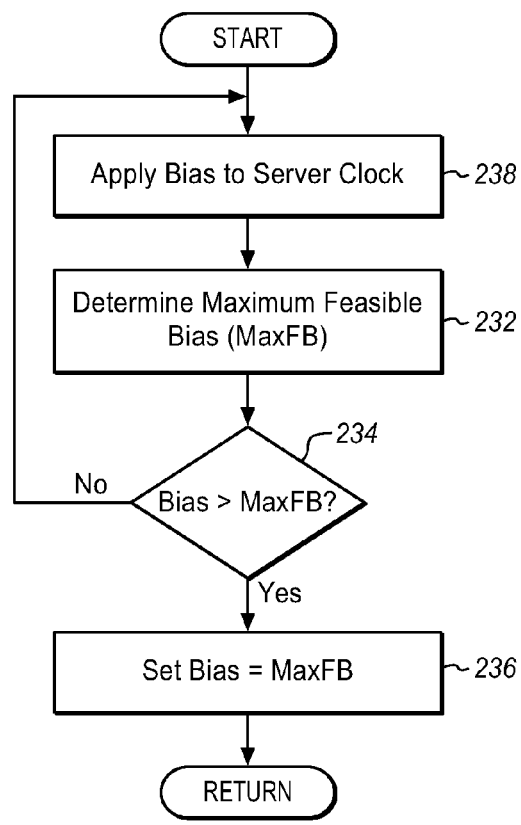

SYNCHRONIZATION OF CLOCKS BETWEEN TWO COMMUNICATION TERMINALS USING TCP/IP

CLAIM OF PRIORITY

This application claims the benefit of U.S. Provisional Patent Application 61/513,769 entitled Synchronization of Clocks Between Two Computers using TCP/IP, by Barry Spencer, filed Aug. 1, 2011 (the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The present description relates to the field of synchronizing clocks of two computers coupled through a network connection and, in particular, to synchronizing using packets transmitted using the Transmission Control Protocol.

BACKGROUND

Communication terminals such as computers, telephones, and conferencing terminals are driven by processors and controllers that have separate or shared clocks within each terminal. However, the clock for each terminal operates independently of the clocks of other terminals. Even if clocks of two different terminals are synchronized, they will drift apart over time because the two clocks will count time at slightly different speeds.

Computer clock rates differ in small amounts. One clock almost always runs faster than the other. While the difference in clock rates can be quite small, these small differences can quickly add-up and become a significant problem, especially in systems that perform ongoing clock based calculations over a long period of time.

Some systems allow communication terminals to be synchronized to a common master clock. However, this is typically done using a special signal or a separate communications channel. The special provisions increase the cost of the system either in signaling and energy or in hardware. Even with a special clock signal, the clock signal will require some time to travel from the master clock to each communications terminal. This is the propagation delay. If the terminals are at different distances from the master clock, then the clock signals will be received with different propagation delays, so the terminal will not be synchronized unless the differences in propagation delay can be determined. In some cases, such as protected environments, computer software does not have control over the clock on the local system.

If the path between the two clocks is not known, then the propagation delay cannot be compensated. The difficulty in synchronizing is made worse if the clock signals travel across a typical data packet network. In Ethernet and many other types of networks, the path from one terminal to another changes depending on network traffic loads and decisions made at routers in the path. The propagation delay may also vary depending on the responsiveness of the routers on the path. With Internet traffic routing may vary even more. Because the path from one terminal to another may be different at different times and the terminals on that path may operate with different speeds, it is difficult to accurately synchronize clocks between two different communication terminals using the packet data networks.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 1 is a block diagram of a client node coupled to a server node through a communications network in an embodiment.

FIG. 2A is a process flow diagram of exchanging packets with time stamps in an embodiment.

FIG. 2B is a process flow diagram of setting a bias using a minimal feasible value in an embodiment.

FIG. 2C is a process flow diagram of setting a bias using a maximum feasible value in an embodiment.

DETAILED DESCRIPTION

Figure 3:
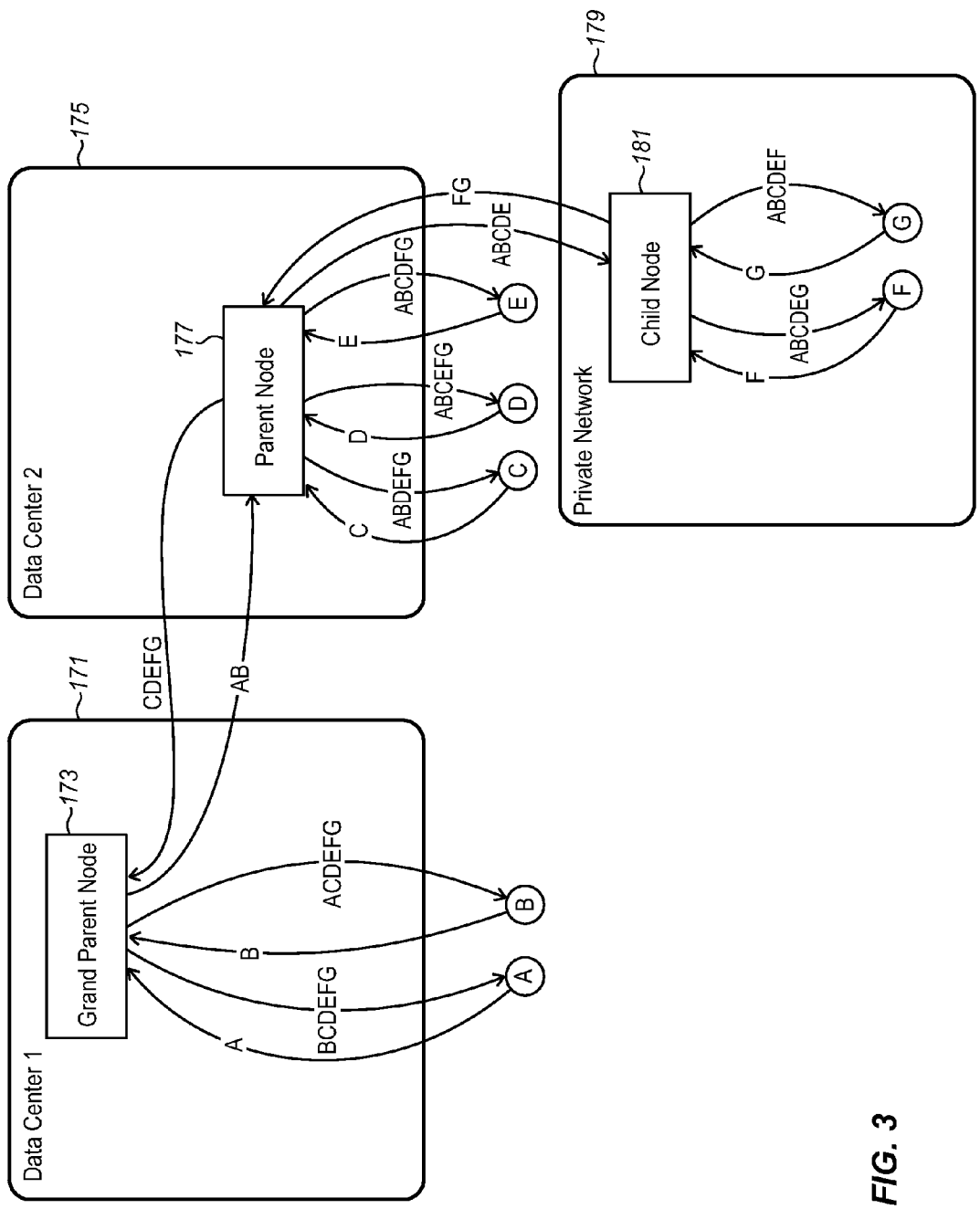
FIG. 3 is a block diagram of tiered mesh conferencing nodes in different networks according to an embodiment.

As described below, clocks can be continuously synchronized between two systems, using TCP (Transmission Control Protocol)/IP (Internet Protocol. Time stamps can be added to packets from the client to the server and from the server to the client. These time stamps can be used to adjust an absolute clock time. By repeating the time stamps through many packets over time the synchronization can be maintained with some accuracy. This synchronization requires almost no additional packet overhead and can be performed as long as the two terminals are communicating with each other. While TCP/IP has an almost random variation in its propagation delays and the propagation delay in one direction is often different than the delay in the opposite direction, the clock can be synchronized well enough for precise timing measurements.

In some applications, a bandwidth measurement is used to scale traffic data rates between a client and a server. These measurements may rely heavily on a knowledge of the timing between the client and server clocks. In a system that relies on round-trip packet transmission between a client and server using TCP/IP, it may be important to determine latency variations in outbound traffic separately from latency variations in inbound traffic.

By measuring latency separately, it is possible to measure inbound and outbound bandwidth independently. As mentioned above, some bandwidth measurement algorithms rely on accurate measurement of packet latency. This is the amount of time it takes packets to move from a transmitter or transmit port in one computer, to a receiver or receive port on another computer.

To measure the latency, timestamps can be recorded at 4 points in the system:
 a) Client Departure Time: when the packet is sent by the client
 b) Server Arrival Time: when the packet is received at the server
 c) Server Departure Time: when the packet is sent by the server d) Client Arrival Time: when the packet is received by the client.

In this example, the latency is being determined by a client in a client server structure. However, the roles of the two systems may be reversed or other types of systems may be used such as peers, nodes, etc. There are two primary values that may be determined using the time stamps. The first is:

Outbound Latency=Server Arrival Time−Client Departure Time

The outbound latency is simply the time that it takes for a packet to travel from the client to the server. This may also be referred to as upstream or uplink latency. The server may determine the outbound latency by comparing the time that it receives the packet to a time stamp added to the packet by the client. The client can determine the outbound latency by comparing a time stamp that the server attaches to a packet upon its arrival at the server to the time that the client sent the packet.

The second primary value is the inbound latency that can be determined as:

Inbound Latency=Client Arrival Time−Server Departure Time

Like the outbound latency, the inbound latency can be determined by the client by comparing a time stamp applied by the server when it sends the packet to the client to the time at which the client receive the packet. For the server, the client can send a latency value to the server after it has been determined by the client.

While the above latency measures provide information about packet travel time, the actual time determined in the calculations above is not accurate because the client and server timestamps are applied by separate computers with separate clocks. FIG. 1 shows an example of two communication terminals, such as computers, video conferencing nodes or other devices that are coupled to each other through an IP network, such as an intranet or the Internet.

The client node or terminal 102 has an internal clock 104 and processing resources 105 to generate packets, and timestamps and to made calculations, among other functions. It also has a user interface 107 to receive commands and generate responses. In the case of a videoconferencing device, the user interface may include a microphone and a speaker for voice communication. It may also include camera and display for video communication. The device may also include file and text input and transfer resources and more conventional user interface components, such as a keyboard, cursor, and selection controls.

The client computer 102 has a communications interface with a transmit port 106 and a receive port 108, such as a network interface that may be wired or wireless. Typically the port share a common physical interface such as Ethernet or Wi-Fi, among others. The transmit and receive ports are coupled through an IP network 120 to a server terminal or computer 112.

The server device similarly has an internal clock 114, processing resources 115, which may include memory and a user interface 117. The server device also has a transmit port 116 coupled to the receive port 108 of the client device and a receive port 118 coupled to the transmit port 106 of the client device.

Using the two clocks, ClockC, the client clock 104, and ClockS, the server clock 114, this system continuously updates a bias value or adjustment value that can be added to ClockC to determine the approximate time on the other clock ClockS. Alternatively, the reverse process can be used to determine a bias value to determine the time on the server clock. In some implementations, the server may be coupled to many clients. As a result, processing is simplified if the clients make one adjustment for one or for very few servers, instead of the server making adjustments for many clients.

For each packet received from the server, the client tracks the original client departure time, either through a stored record or a time stamp in the packet. The client also marks the client arrival time. The server applies a time stamp to the packet for the server arrival time and then again for the server departure time. This may be done for each packet or only for some packets. The packets may also include other information such as a sequence No. The packets may be special timing synchronization packets or normal traffic packets. As traffic packets, they will include a general addressability header and user data. The user data may be any type. For video teleconferencing, the user data may include audio, video, and shared files, commands and text. Adding a timestamp to a normal traffic packet will have very little impact on the size or length of the packet and adds almost no processing delay.

FIG. 2A shows a sequence of operations that may be performed. These operations may be repeated as long as the two terminals are in communication or it may be repeated at intervals based on how quickly the clocks are expected to diverge or based on when accurate synchronization is needed. At 202, the client stamps the client departure time on a packet that is ready to sent. At 204, the client sends the packet from its transmit port.

The packet travels through the IP network and, at 206, the server receives the packet. The server then stamps the server arrival time on the packet at 208. At some later time, the server stamps a departure time at 210 and sends the packet at 212 through the IP network to the client. While the described process is described as if the packet is a single packet, it may alternatively be a TCP request and response exchange. In a TCP request/response exchange the request packet may have different user data from the response packet, however, the two packet are connected and time stamps can easily be tracked as if the same packet had been returned back to the client. Similarly, while the exchange is shown as being initiated and ending with the client, the server may initiate a request and receive a response with timestamps. The time information from this exchange may be saved for batch processing later or it may be processed immediately. The processing may be performed, for example, as in FIG. 2A.

Each time a packet is received from the server, the client may determine a minimal feasible bias value and a maximum feasible bias value. The current bias value may be adjusted based on these feasible bias values. The minimal and maximum feasible bias values may be set in a variety of different ways depending on the particular implementation. In one example, the following calculations may occur:

Minimal Feasible Bias=Server Departure Time−Client Arrival Time;

Maximum Feasible Bias=Server Arrival Time−Client Departure Time.

These calculations are an expression that the inbound latency to the client is the smallest amount of latency that the system can experience and the outbound latency is the largest amount of latency that the system can experience.

With these calculations, it has been assumed based on empirical measurements that for the client, the inbound latency is less than the outbound latency. This may be true because a client is allocated more bandwidth to receive data than to transmit data. It may be true because the server is more effectively able to direct traffic to a client than the client is able to direct traffic to a particular server. For a different network implementation, the assumptions may be reversed.

As shown in FIG. 2B, the inbound latency is used as a representation of the minimal feasible bias to adjust the current value of the bias at the client device. When a packet arrives, or when an appropriate interval has elapsed, the receiving device, for example, the client device, determines the minimal feasible bias at 222. This may be done based on the inbound packet latency using a timestamp from the server as shown in FIG. 2A or in any other way, depending on the particular implementation.

At 224 the current bias value is compared to the newly determined minimal feasible bias. If the current bias is less, then at 226, the current bias is set to the minimal feasible bias. This ensures that the system's bias value is never less than the inbound latency or some other minimal value. On the other hand, if the bias value is greater than the minimal feasible bias value, then no adjustment is made. At 228, regardless of whether an adjustment is made, the bias value may be applied to the packets from the server clock to compensate for drift between the two clocks.

FIG. 2C, shows a similar process in which the outbound latency is used as a representation of the maximum feasible bias to adjust the current value of the bias at the client device. When a packet arrives, or when an appropriate interval has elapsed, the receiving device determines the maximum feasible bias at 232. In the formulas above, this uses the outbound latency as determined using the timestamps of FIG. 2A. The elapsed time between the client sending the packet and the server receiving it is used as the maximum feasible bias value, however, the described embodiments are not so limited.

At 234 the current bias value is compared to the newly determined maximum feasible bias. If the current bias is more than the maximum feasible bias value, then at 236, the current bias is set to the maximum feasible bias. This ensures that the system's bias value is never greater than the outbound latency or some other maximum value, depending on the particular implementation. If the bias value is greater than the minimal feasible bias value, then no adjustment is made. At 238, the bias value continues to be applied to the packets from the server clock to compensate for drift between the two clocks.

The principles shown in FIGS. 2B and 2C may be shown in the form of pseudocode as follows:

```
If(Bias > MaximumFeasibleBias)
{
    M_Bias = MaximumFeasibleBias
}
If(Bias < MinimumFeasibleBias)
{
    M_Bias = MinimumFeasibleBias
}
``` wherein M_Bias is the current bias that is applied to the compensate for the drift between the clocks of the two terminal. As shown and described, the maximum error in this system is equal to the round trip latency of an entire cycle and is typically equal to ½ of the round trip latency. Since the two clocks are running at slightly different rates, the bias value will tend to adjust using only one of the two adjustments. In other words, even if only the minimal or the maximum feasible bias values are used, the bias value will still be adjusted and the clocks will be synchronized, but less accurately.

While this is not an exact synchronization, it is accurate enough for the purposes of measuring variations in latency, which can then be used in applications such as bandwidth measurement, among others. As described above, clocks on two or more computers may be synchronized by determining a bias value and adding the determined bias value to at least one clock. The clock is a clock on at least one of the two or more computers.

The accuracy of the synchronization may be increased by making multiple determinations and multiple adjustments. For a single measurement using both the inbound and the outbound packet, the obtained value will be equal to the round trip latency. This may be sufficient for many purposes and needs only be updated periodically. However, for TCP, the round trip latency can vary greatly for different packets sent at about the same time. A primary factor is the actual path taken by each packet. Another factor is available bandwidth or, in other words, congestion in the paths between the two nodes. As frequent measurements are made the variations in packet latency will average out and the bias value will converge toward a typical or normal latency.

A further benefit of the approach described above is that inbound latency can be determined independent of outbound latency. These may be different because of the nature of the nodes and the communication paths between them. For some applications, it is useful to know both values independently of each other and not just the complete round trip or an averaged latency.

The bias value can be applied to the node's clock in a variety of different ways. The bias value may be used to adjust the client node's clock. However, this may not be desired or in some higher security systems, it may not be possible. The bias value may also be applied to a software counter that tracks relative times for packets based on the clock rate but not using the actual sequence number or time of day from the clock.

While the operations are shown as all being performed and in a particular sequence, some of the operations may be removed and reordered depending on the particular implementation. For example, either the minimal or the maximum feasible value may be used or both. The compensated or synchronized clock may be used before or after it is adjusted or both. Inbound or outbound packets may be monitored for synchronization or both.

FIG. 3 is a block diagram of an example of a more complex network architecture than FIG. 1 that includes seven participants A, B, C, D, E, F, and G spanning two regions where the users F, G in one of the regions are in a private network. The illustrated example is directed to video teleconferencing, but may also be adapted to any other sort of TCP/IP type of communications. The client terminals A, B, C, D, E, F, and G all communicate with each other using TCP through server nodes 373, 377, 381.

A first region has a first data center 371, Data Center 1 and a second data center 375, Data Center 2. Data Center 1 serves client nodes A and B. These client nodes communicate with a grandparent node 373 of the data center. The client nodes send upstream input data as their own user stream and receive downstream or output data from all the other users coupled to or through the grandparent node 373. The client nodes receive streams from one or more of the other client nodes, depending on the particular implementation.

Data Center 2 375 has at least one other meshed conferencing node 377 indicated in this example as a parent node. The parent node in the second data center of the first region receives a video teleconferencing or other data stream from the grandparent node 173 in the first region 171 and sends streams back to the grandparent node data from some or all of the other users in the network C, D, E, F, and G. The parent meshed conferencing node is coupled to users C, D, and E and receives their data streams and then sends their streams back to each of those users. As indicated in for example FIG. 5, the parent node may be coupled directly or indirectly to one or more other users in addition to the users C, D, and E.

In a second region a private network 379 has a mesh conferencing node 381, indicated as a child node coupled to users F and G. Users F and G transmit their streams up to the child node 381 and receive streams from the child node which include streams from one or more of the other users in the system. The second region is shown as a private network in which the client nodes are within the network in order to maintain privacy. The connection between the client nodes and child node may be an internal network connection or it may be a virtual private network. By contrast, in the first and second regions 371 and 375 the client nodes are shown as being outside of the data center in their connection.

The client nodes may synchronize clocks with their respective server nodes 373, 377, 381 using the techniques described herein. The server node may also synchronize clocks with each other using the same techniques. The time stamps may be attached to packets carrying video and audio streams, or to packets carrying any other data.

Figure 4:
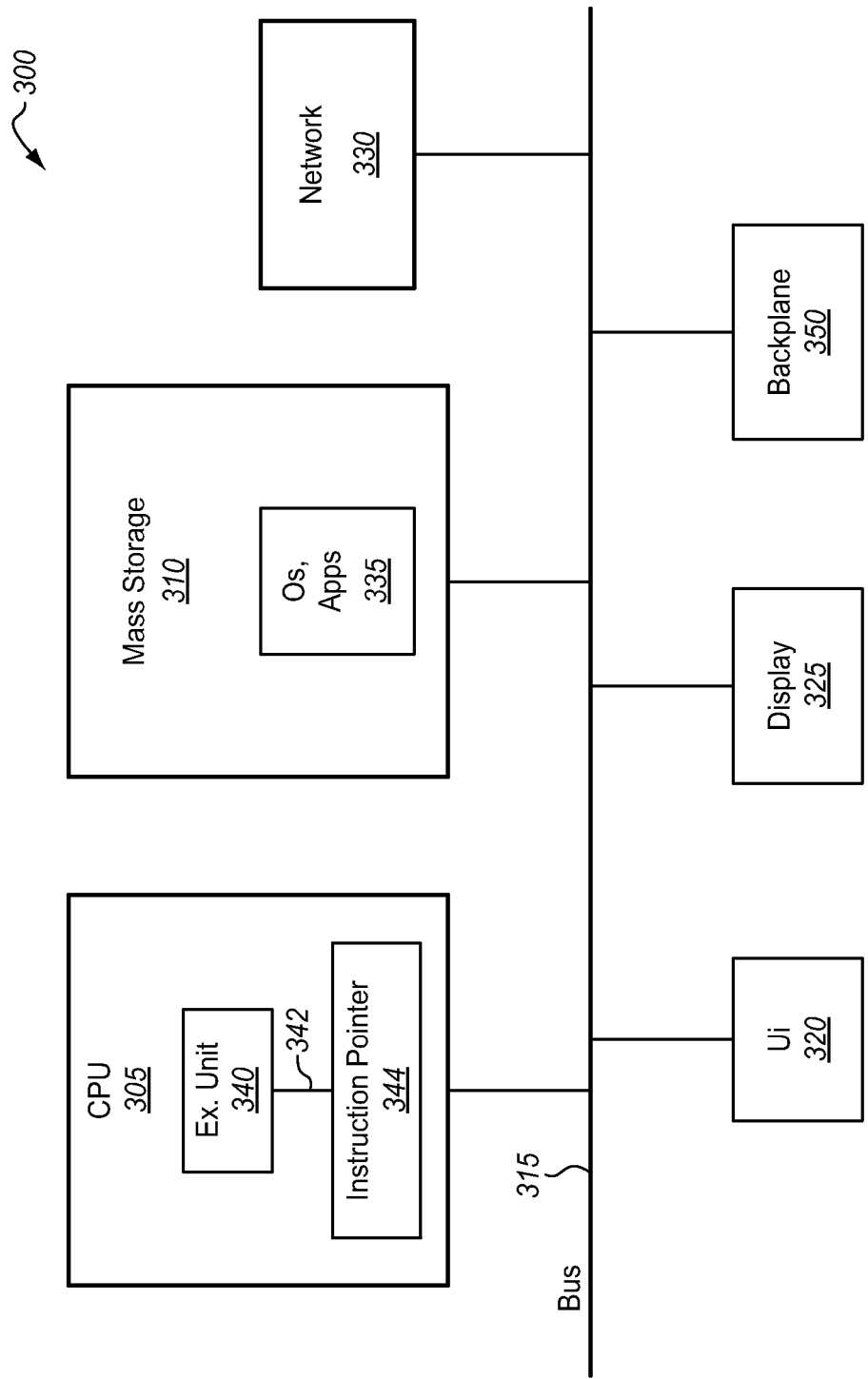
FIG. 4 is a block diagram of a network node suitable for use with embodiments.

FIG. 4 is a block diagram illustrating an exemplary computer system 300, suitable for use as a terminal, a node, or a network processor according to one embodiment. The exemplary computer system 300 includes a processor 305 coupled to a storage device 310 by a bus 315. In addition, a number of user input/output devices, such as a keyboard 320 and a display 325, may also be coupled to the bus 315, but are optional parts. A network 330 interface and a backplane 350 interface may also be coupled to bus 315, for example through a chassis. The processor 305 (single or multi core; and if multi core, symmetrical or asymmetrical cores) includes at least a central processing unit of any type of architecture, such as CISC, RISC, VLIW, or hybrid architecture. The processor 305 may also include a graphics processing unit (e.g., one or more cores), graphic bus interface(s), a memory management unit, and main memory bus interface(s). Furthermore, the processor 305 may be implemented on one or more die within the same chip.

The storage device 310 and network traffic represents one or more machine-readable media. Thus, machine-readable media include any mechanism that provides (i.e., stores and/or transmits) information in a form readable by a machine (e.g., a computer). For example, a machine-readable medium may be machine-readable storage media (e.g., magnetic disks; optical disks; random access memory; read only memory; flash memory devices), machine-readable communication media (e.g., electrical, optical, acoustical or other form of propagated signals such as carrier waves, infrared signals, digital signals, etc.); etc. The bus 315 represents one or more busses and bridges (also termed as bus controllers). While this embodiment is described in relation to a single processor computer system, other embodiments could include a multi-processor computer system.

FIG. 4 also illustrates that the storage device 310 has stored therein stream prioritization software 335 for execution on the processor 305 to provide for the scaling and multiplexing of received and transmitted streams. Of course, the storage device 310 preferably contains additional software such as an operating system and various applications (not shown).

FIG. 4 additionally illustrates that the processor 305 includes an execution unit 340, an internal bus 342, and an instruction pointer register 344. Of course, processor 305 contains additional circuitry, which is not necessary to understanding this description.

The internal bus 342 couples several of the elements of the processor 305 together as shown. The execution unit 340 is used for executing instructions. The instruction pointer register 344 is used for storing an address of an instruction currently being executed by the execution unit 340.

A network element (e.g., communications terminal, client or server node, mesh conferencing node) may be an end station, a router, a bridge, or specifically adapted device and is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

The described embodiments provide tools and techniques for synchronizing clocks and these are illustrated in the figures above. In those figures, a few different components are illustrated including, but not limited to: grandparent nodes, parent nodes, and child nodes. These nodes are meant to illustrate a hierarchical relationship that may exist between nodes that communicate data packets and streams over a network. A node as used herein can be a streaming server, a client on a network, or some computing resource that can receive, analyze, prioritize, and/or forward streamed data. Accordingly, as illustrated, multiple data streams can be prioritized and then fed into a multiplexor. In one implementation, the multiplexor is a node (e.g., a grandparent node or a parent node). One multiplexor can then forward that to another node, where the data streams are again prioritized and forwarded on.

The system may also measure how much bandwidth a user has. The system then picks and chooses which data streams to send to the user. In some case, it may limit the number of data streams sent to a user and alternate between streams as each data stream's priority level changes.

The techniques shown in the figures can be implemented using code and data stored and executed on one or more electronic devices (e.g., a client or mesh node or other network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method to determine a clock time difference between a first terminal and a second terminal, the method comprising:
    sending a first Internet Protocol packet from the first terminal to the second terminal, the packet having a time stamp indicating the time at which it was sent from the first terminal;
    receiving a second Internet Protocol packet at the first terminal from the second terminal, the packet having a time stamp indicating the time at which it was sent from the second terminal;
    comparing the time stamp of the second packet and an arrival time at the first terminal to determine an inbound latency;
    comparing the determined inbound latency to the stored bias;
    setting the stored bias to the determined inbound latency if the stored bias is less than the determined inbound latency; and
    determining a clock time difference at the second terminal using the stored bias.

2. The method of claim 1, wherein the packet from the first terminal is the same packet as the packet from the second terminal.

3. The method of claim 1, further comprising:
    comparing the time stamp of the first packet and an arrival time at the second terminal to determine an outbound latency;
    comparing the determined outbound latency to the stored bias; and
    setting the stored bias to the determined outbound latency if the stored bias is greater than the determined outbound latency.

4. The method of claim 3, wherein the second packet received from the second terminal includes a time stamp indicating the time at which the first packet was received at the second terminal and wherein comparing the time stamp of the first packet and an arrival time at the second terminal comprises comparing the time stamp indicating the time at which the first packet was sent from the first terminal to the time stamp of the second packet indicating the time at which the first packet was received at the second terminal.

5. The method of claim 1, further comprising adjusting a clock of the first terminal using the stored bias.

6. The method of claim 1, further comprising determining a bandwidth of a connection between the first and the second terminal using the stored bias.

7. The method of claim 1, further comprising determining a maximum data rate through a connection between the first and second terminal using the stored bias.

8. The method of claim 1, wherein the first terminal is a video teleconferencing node and the second terminal is an upstream video teleconferencing node in a network of video teleconferencing nodes coupled through an Internet Protocol and wherein the stored bias is stored in a clock bias value register of the video teleconferencing node.

9. The method of claim 1, further comprising using the determined clock time difference to adjust an absolute time between the first terminal and the second terminal.

10. A non-transitory machine-readable medium having instructions that when operated on by the machine cause the machine to perform operations comprising:
    sending a first Internet Protocol packet from a first terminal to a second terminal, the packet having a time stamp indicating the time at which it was sent from the first terminal;
    comparing the time stamp of the first packet and an arrival time at the second terminal to determine an outbound latency;
    comparing the determined outbound latency to a stored bias; and
    setting the stored bias to the determined outbound latency if the stored bias is greater than the determined outbound latency;
    receiving a second Internet Protocol packet at the first terminal from the second terminal, the packet having a time stamp indicating the time at which it was sent from the second terminal;
    comparing the time stamp of the second packet and an arrival time at the first terminal to determine an inbound latency;
    comparing the determined inbound latency to the stored bias;
    setting the stored bias to the determined inbound latency if the stored bias is less than the determined inbound latency; and
    determining a clock time difference at the second terminal using the stored bias.

11. The method of claim 1, wherein the packet from the first terminal is the same packet as the packet from the second terminal.

12. The medium of claim 10, the operations further comprising:
    comparing the time stamp of the first packet and an arrival time at the second terminal to determine an outbound latency;
    comparing the determined outbound latency to the stored bias; and
    setting the stored bias to the determined outbound latency if the stored bias is greater than the determined outbound latency.

13. The medium of claim 12, wherein the second packet received from the second terminal includes a time stamp indicating the time at which the first packet was received at the second terminal and wherein comparing the time stamp of the first packet and an arrival time at the second terminal comprises comparing the time stamp indicating the time at which the first packet was sent from the first terminal to the time stamp of the second packet indicating the time at which the first packet was received at the second terminal.

14. The medium of claim 10, the operations further comprising adjusting a counter of the first terminal using the stored bias.

15. The medium of claim 10, the operations further comprising applying the bias to a second terminal reference maintained at the first terminal.

16. A conferencing node coupled to an upstream conferencing node, the conferencing nodes both having an internal clock, the conferencing node comprising:
- a transmit port to send a first Internet Protocol packet from the conferencing node to the upstream conferencing node, the packet having a time stamp indicating the time at which it was sent from the conferencing node;
- a receive port to receive a second Internet Protocol packet at the conferencing node from the upstream conferencing node, the packet having a time stamp indicating the time at which it was sent from the upstream conferencing node;
- a register to store a clock bias value; and
- a processor to compare the time stamp of the first packet and an arrival time at the upstream conferencing node to determine an outbound latency, to compare the determined outbound latency to the stored clock bias value, to set the stored bias to the determined outbound latency if the stored bias is greater than the determined outbound latency, to compare the time stamp of the second packet and an arrival time at the conferencing node to determine an inbound latency, to compare the determined inbound latency to the stored clock bias value, to set the stored clock bias value to the determined inbound latency if the stored clock bias value is less than the inbound latency, and to determine a clock time difference at the upstream conferencing node using the stored clock bias value bias.

17. The conferencing node of claim 16, the processor further:
- comparing the time stamp of the first packet and an arrival time at the upstream conferencing node to determine an outbound latency;
- comparing the determined outbound latency to the stored bias; and
- setting the stored bias to the determined outbound latency if the stored bias is greater than the determined outbound latency.

18. The conferencing node of claim 16, wherein the second packet received from the upstream conferencing node includes a time stamp indicating the time at which the first packet was received at the upstream conferencing node and wherein comparing the time stamp of the first packet and an arrival time at the upstream conferencing node comprises comparing the time stamp indicating the time at which the first packet was sent from the conferencing node to the time stamp of the second packet indicating the time at which the first packet was received at the upstream conferencing node.

19. The conferencing node of claim 16, wherein the processor is further to use the clock time difference to adjust an absolute clock time between the conferencing node and the upstream conferencing node.

* * * * *